United States Patent [19]

Konishi et al.

[11] Patent Number: 5,213,173
[45] Date of Patent: May 25, 1993

[54] ELECTRIC POWER STEERING APPARATUS

[75] Inventors: Hideo Konishi; Hiroshi Nishikiori, both of Saitama, Japan

[73] Assignee: Jidosha Kiki Co., Ltd., Tokyo, Japan

[21] Appl. No.: 781,045

[22] Filed: Oct. 18, 1991

[30] Foreign Application Priority Data

Oct. 26, 1990 [JP] Japan .................................. 2-287222

[51] Int. Cl.5 ............................................ B62D 5/04
[52] U.S. Cl. .................................. 180/79.1; 180/147; 74/388 PS
[58] Field of Search .................. 180/79.1, 147, 148; 74/388 PS, 409

[56] References Cited

U.S. PATENT DOCUMENTS

| 4,391,157 | 7/1983 | Jacklin | 74/402 |
| 4,799,566 | 1/1989 | Shimuzu | 180/79.1 |
| 4,898,258 | 2/1990 | Ohe et al. | 180/79.1 |

FOREIGN PATENT DOCUMENTS

| 61-226362 | 10/1986 | Japan . | |
| 4574 | 1/1989 | Japan | 180/79.1 |
| 115771 | 5/1989 | Japan | 180/79.1 |
| 120177 | 5/1990 | Japan | 180/79.1 |
| 2-100876 | 8/1990 | Japan . | |
| 224870 | 10/1991 | Japan | 180/79.1 |
| 264273 | 1/1927 | United Kingdom | 74/409 |
| 558700 | 1/1944 | United Kingdom | 74/409 |

Primary Examiner—Margaret A. Focarino
Assistant Examiner—Kevin Hurley
Attorney, Agent, or Firm—Townsend and Townsend, Khourie and Crew

[57] ABSTRACT

An electric power steering apparatus includes a gear wheel on a driven side having a gear portion on one side surface thereof on a steering shaft and a pinion to be laterally meshed with a gear portion of the gear wheel on a shaft capable of transmitting a rotational driving force from an electric motor. The gear wheel and the pinion constitute a gear mechanism for transmitting a rotational force as a gear pair with non-parallel, non-intersecting axes. The gear wheel is axially supported on the steering shaft so as to be coupled in only a rotational direction and movable in an axial direction of the shaft. A biasing unit is provided on the other side of the gear wheel opposite to a portion of the pinion to be meshed with the gear portion and laterally urges the gear wheel toward the pinion.

6 Claims, 2 Drawing Sheets

ELECTRIC POWER STEERING APPARATUS

BACKGROUND OF THE INVENTION

The present invention relates to an electric power steering apparatus using an electric motor as an auxiliary steering force generating means and, more particularly, to an improvement in an electric power steering apparatus capable of preventing generation of gear teeth striking noise or the like caused by a backlash upon meshing between gears in a gear mechanism which constitutes a rotational force transmission system for transmitting a rotational driving force of an electric motor to a steering shaft.

Various types of electric power steering apparatuses using an electric motor as an auxiliary steering force generating means have been proposed as described in, e.g., Japanese Patent Laid-Open No. 61-226362. Since an electric apparatus of this type has an arrangement simpler than those of conventional hydraulic apparatuses, a lightweight, compact arrangement of the entire apparatus can be realized. In addition, the apparatus can transmit a proper and reliable auxiliary steering force to vehicle wheels in accordance with a steering operation of a driver or various driving conditions of a vehicle. Furthermore, since the apparatus need be driven when a steering operation must be performed, energy saving can be achieved.

In order to adopt an electric motor as the auxiliary steering force generating means as described above, however, since various problems are present in, e.g., a structure of coupling the motor to a steering system and operation performance such as responsiveness including operation control of the motor, there is still large room left for improvements in the respective parts of the apparatus.

For example, one problem in an arrangement of the above electric power steering apparatus is a backlash generated between a pinion on a motor shaft of an electric motor and a gear wheel on the driven side which meshes with the pinion and is present on a steering wheel side. That is, in such a gear mechanism for transmitting a rotational force, a backlash is naturally necessary between gears in order to properly and reliably perform transmission of rotation. If, however, this backlash is unnecessarily large, a play is generated in a meshed portion between the gears to generate teeth striking noise or rattling noise when a steering operation is performed in a counterclockwise or clockwise direction. In addition, since a torque variation is easily generated due to meshing, poor responsiveness may be undesirably caused during transmission of rotation. This will be easily understood because the backlash between a pinion of a motor and a gear wheel on the driven side is increased also by a dimensional error in each part of a gear mechanism or a gap required to ensure movement of the part. On the other hand, a steering shaft of a steering wheel is coupled to an input shaft by a universal joint or the like with a predetermined angle therebetween. Therefore, the input shaft and an output shaft coupled to the input shaft via a torsion bar are swung due to bending or vibration of the steering shaft caused during a steering operation to unnecessarily increase the backlash. Therefore, generation of the play described above cannot be avoided.

When the backlash is increased to increase the play as described above, a motor is driven in a forward or reverse direction accordingly to generate an idling state during transmission of rotation. Therefore, if a vehicle runs on a rough road or runs onto curbstones during driving, vehicle wheels are turned by a force of action from the ground surface, and an impact rotational force so-called "kick back" is applied as a reverse input from the vehicle wheels. As a result, problems in which, e.g., gears strike each other to generate teeth striking noise or the like, are posed.

If the backlash is zero, it is naturally possible to avoid generation of a play and solve the problem of teeth striking noise. Since, however, not only high machining accuracy is required to obtain a zero backlash, but also transmission of rotation performed by meshing between the gears becomes impossible. Therefore, the zero backlash is practically impossible.

The present applicant, therefore, has previously proposed an arrangement by, e.g., U.S. Ser. No. 460,779 (abandoned) in which a gear wheel such as a hypoid gear having a gear portion on its one side surface is axially supported on a steering shaft so as to be slidable along the axial direction, and biasing means such as a coil spring, a leaf spring, or a wave washer is provided to bias the gear wheel in a direction to mesh the gear wheel with a pinion. In this arrangement, a backlash in a portion of the gear wheel to be meshed with the pinion can be adjusted to be almost zero in a non-steering state.

In this conventional structure, however, the entire gear wheel is merely biased on the shaft toward the pinion. Therefore, in a hypoid gear as a gear pair with non-parallel, non-intersecting axes in which a gear wheel and a pinion are arranged such that the pinion meshes with some teeth of a gear portion formed on the side surface of the gear wheel, the gear wheel is shifted with respect to the shaft due to a difference between forces of action in the axial direction of portions to be and not to be meshed with the pinion. As a result, a so-called falling phenomenon may be caused in a gap formed in accordance with machining accuracy or the like in an axially supported portion of the gear wheel with respect to the shaft. If such a falling phenomenon occurs, occurrence of a pinching or catching phenomenon between the axially supported portion of the gear wheel and the shaft cannot be avoided to pose problems such as a play in the gear wheel, generation of teeth striking noise caused by the play, a torque variation, and locking between the teeth of the gear wheel and the pinion. Therefore, a demand has arisen for a countermeasure capable of solving these problems.

SUMMARY OF THE INVENTION

It is an object of the present invention to provide a gear mechanism for transmitting an auxiliary steering force, which comprises a gear pair with non-parallel, non-intersecting axes, such as a hypoid gear, constituted by a gear wheel to be meshed with a pinion of an electric motor for supplying an auxiliary steering force to a steering shaft, in which a play caused by meshing during a steering operation or kick back is prevented to prevent generation of teeth striking noise caused by the play, and a falling phenomenon of the gear wheel is prevented to perform transmission of rotation in a predetermined state and improve responsiveness.

In order to achieve the above object of the present invention, there is provided an electric power steering apparatus which comprises a gear wheel on a driven side having a gear portion on one side surface thereof on a steering shaft and a pinion to be laterally meshed with a gear portion of the gear wheel on a shaft capable of transmitting a rotational driving force from an electric motor, and in which the gear wheel and the pinion constitute a gear mechanism for transmitting a rotational force as a gear pair with non-parallel, non-intersecting axes, wherein the gear wheel is axially supported on the steering shaft so as to be coupled in only a rotational direction and movable in an axial direction of the shaft, and biasing means is provided on the other side of the gear wheel opposite to a portion of the pinion to be meshed with the gear portion and laterally urges the gear wheel toward the pinion.

DETAILED DESCRIPTION OF THE INVENTION

Figure 1:
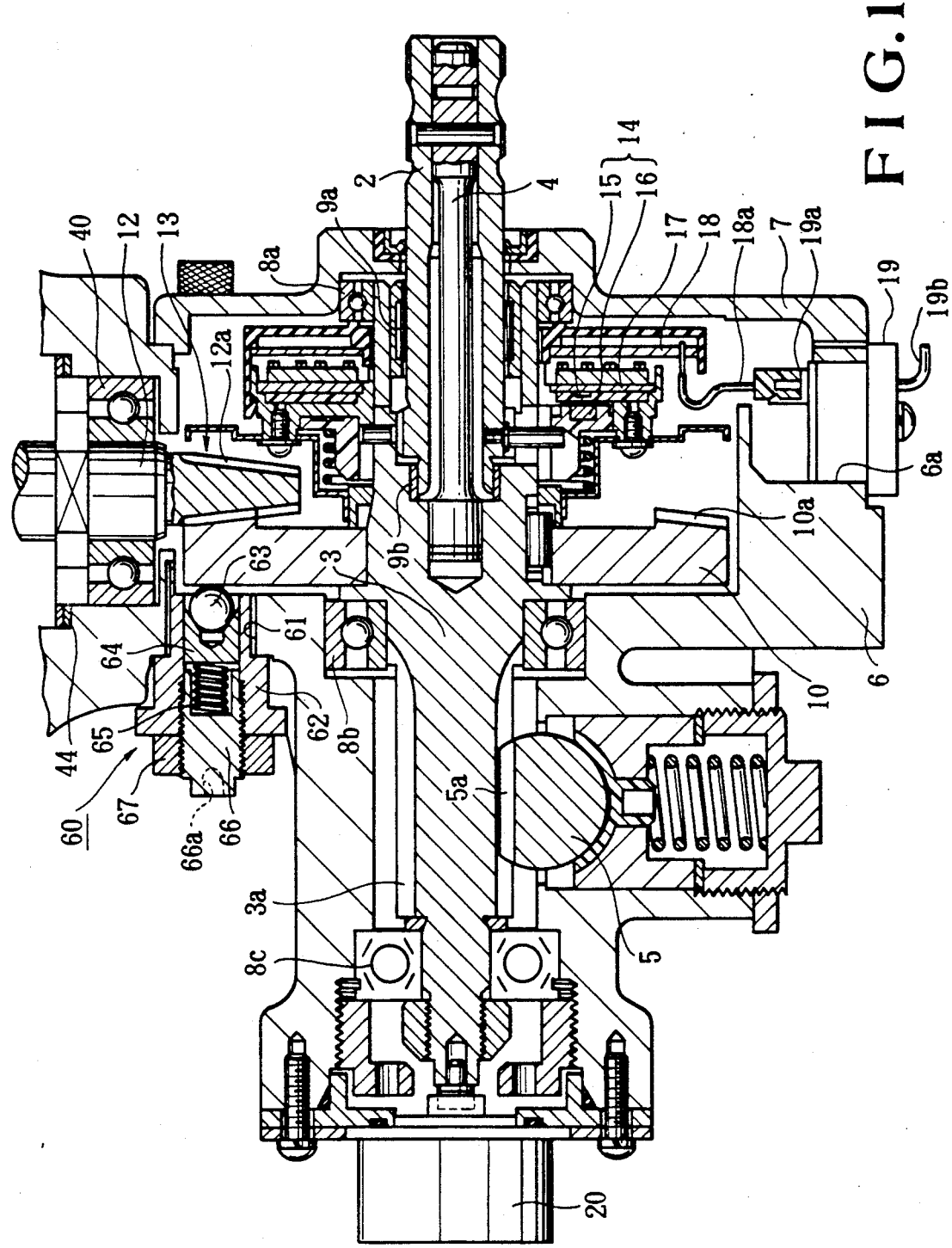
FIG. 1 is an enlarged schematic side sectional view in showing a main part of an embodiment of an electric power steering apparatus according to the present invention.
Figure 2:
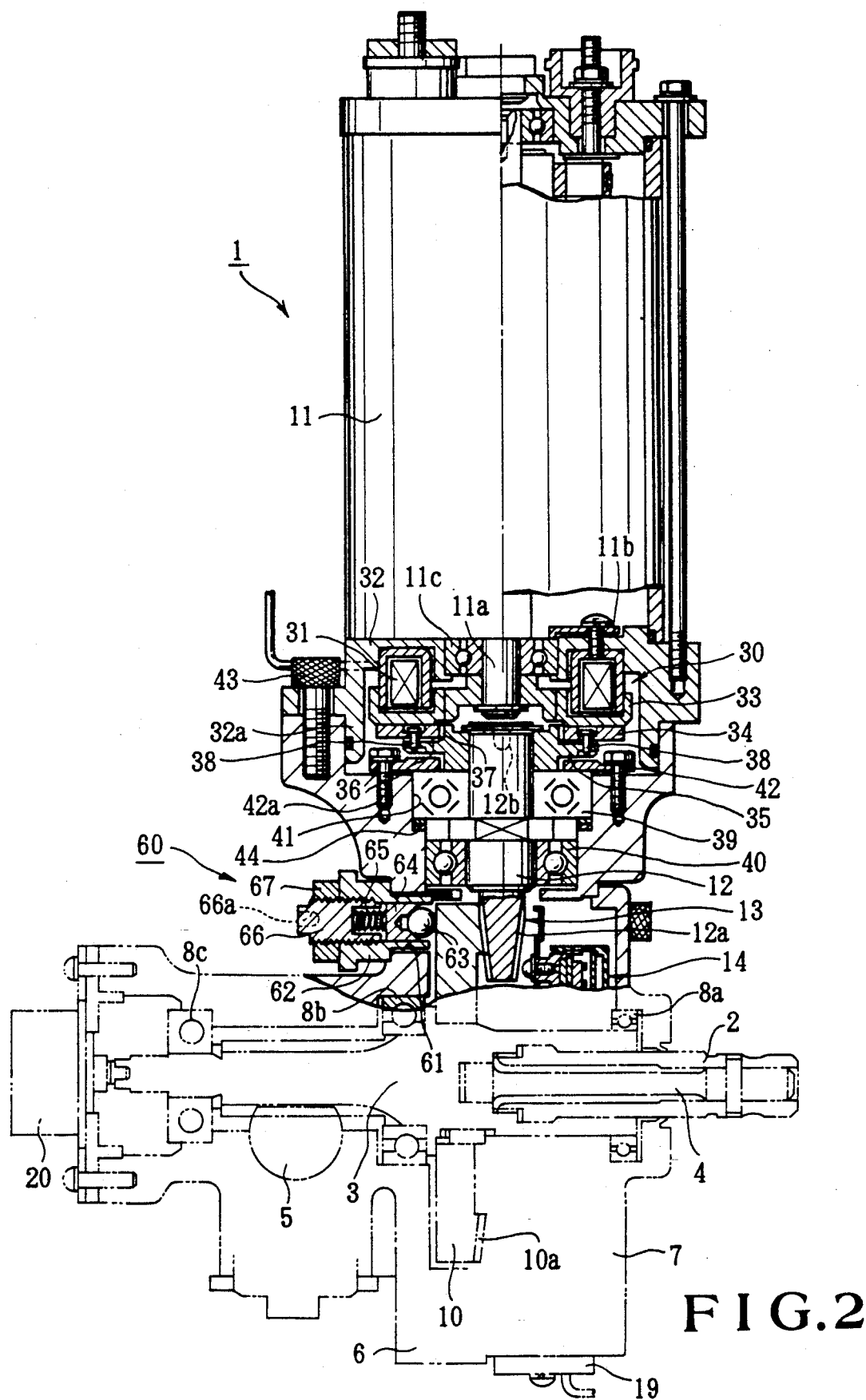
FIG. 2 is a schematic sectional view for explaining an arrangement of the entire apparatus shown in FIG. 1.

FIGS. 1 and 2 show an embodiment of an electric power steering apparatus according to the present invention. A schematic arrangement of the electric power steering apparatus generally denoted by reference numeral 1 will be briefly described below with reference to FIGS. 1 and 2. Reference numeral 2 denotes a stab shaft as an input shaft to be coupled with a steering wheel (not shown); 3, a pinion shaft as an output shaft which has a pinion 3a and is coupled with vehicle wheels (not shown); and 4, a torsion bar for connecting the shafts 2 and 3 such that the two shafts can be rotationally displaced relatively to each other within a predetermined range of angle. These parts constitute a steering shaft. The shafts 2 and 3 and the like constituting the steering shaft together with a rack 5 having rack teeth 5a to be meshed with the pinion 3a are arranged to extend through steering gear bodies 6 and 7 and are rotated in accordance with a steering operation. Reference numerals 8a, 8b, 8c, 9a, and 9b denote bearings such as ball bearings, needle bearings, or bushes for rotationally supporting the shafts 3 and 2 in the bodies 6 and 7. The rack 5 together with a Pitman arm, a tie rod, and the like (none of which are shown) constitute a steering link mechanism for coupling vehicle wheels.

In the steering shaft mechanism portion according to this embodiment, a gear wheel 10 which has a teeth surface (gear portion) 10a and serves as a transmitted gear is axially supported on the pinion shaft 3 on the steering wheel side coupled to the stab shaft 2 on the steering wheel side via the torsion bar 4. An electric motor 11 for supplying an auxiliary steering force to the pinion shaft 3 via the gear wheel 10 and a gear shaft 12 for receiving transmission of rotation from a motor shaft 11a of the motor 11 are coaxially arranged substantially perpendicularly to the pinion shaft 3. A pinion 12a as a transmitting gear which constitutes, together with the gear wheel 10, a reduction gear mechanism serving as a gear mechanism 13 for transmitting an auxiliary steering force is arranged at the distal end of the gear shaft 12 so as to be laterally meshed with a part of the gear surface 10a of the gear wheel 10. Therefore, the auxiliary steering force from the motor 11 can be transmitted to the pinion shaft 3. With this arrangement, the gear bodies 6 and 7 having the steering shafts (2, 3, and 4) and the like, and the electric motor 11 to be directly coupled to the pinion shaft 3 via the reduction gear mechanism constituted by the hypoid gear, a bevel gear, and the like can be efficiently coupled with each other. As a result, a lightweight, compact arrangement of the entire apparatus can be realized. In particular, according to this embodiment using the hypoid gear, the apparatus can be miniaturized in the axial direction by a difference between the non-parallel, non-intersecting axes.

A detecting mechanism 14 for detecting a relative rotational displacement caused between the stab shaft 2 and the pinion shaft 3 by twisting of the torsion bar 4 to drive the motor 11 is constituted by a Hall element 15 arranged on the pinion shaft 3 side and a magnet 16 arranged on the stab shaft 2 side to oppose the Hall element 15, as a non-contact type torque sensor, and a printed circuit board 17 on which the Hall element 15 is mounted and which has a sensor signal processing circuit as its detecting circuit. A detection signal from the detecting mechanism is extracted through a lead wire 18a from an output signal extracting slip ring formed integrally with the circuit board 17 and a brush holder 18 which has a brush (slider) to be brought into slidable contact with the slip ring and serves as a signal extracting portion. The signal is further extracted outside the body 6 by a connector member 19 having a join portion 19a connected to a connector portion at the distal end of the lead wire 18a. The connector member 19 is detachably fixed by screws while an opening portion 6a formed in the body 6 is closed by a sealing material so as to form a watertight structure. A lead wire 19b electrically connected to the joint portion 19a and extracted outside is arranged inside the connector member 19. Note that the detecting mechanism 14 including the torque sensor constituted by the Hall element 15 and the magnet 16 has substantially the same arrangement as that of a mechanism disclosed in, e.g., Japanese Patent Laid-Open No. 1-115771 and a detailed description thereof will be omitted.

Reference numeral 20 denotes a steering angular velocity sensor for detecting a steering angle and its angular velocity on the basis of rotational displacement at the distal end of the pinion shaft 3 as an output member in a steering system for supplying an auxiliary steering force to vehicle wheels in accordance with a steering operation.

The apparatus of this embodiment further comprises an electromagnetic clutch 30 for selectively connecting and disconnecting transmission of rotation between the motor shaft 11a interposed between the electric motor 11 for transmitting an auxiliary steering force to the pinion shaft 3 (output shaft system) as the steering shaft on the vehicle wheel side and the gear mechanism 13 constituted by the pinion 12a and the gear wheel 10, and the gear shaft 12 having the pinion 12a for transmitting the force to the pinion shaft 3. A clutch housing 32 as a fixed member including a field core 31 of the electromagnetic clutch 30 is fixed to a main body 11b of the motor 11, and its clutch rotor 33 to be magnetized by the field core 31 is arranged on the motor shaft 11a. An armature 34 to be selectively attracted to the clutch rotor 33 is arranged on a flange-like portion 35 on the gear shaft 12 so as to be slidable along the axial direction while being biased to be brought into contact with the clutch rotor 33 by a leaf spring 36. Reference numeral 37 denotes a spline connecting portion between the armature 34 and the flange-like portion 35; and 38, guide pins for connecting these two members such that they are not rotated but movable in the axial direction. A cylindrical portion 32a of the clutch housing 32 of the motor main body 11b is fitted in and fixed by spigot joint coupling to a stepped bearing hole 41 of the steering body 6. The bearing hole 41 axially supports the gear shaft 12 via ball bearings 39 and 40 so that the bearings 39 and 40 can rotate.

Reference numeral 11c denotes a ball bearing for axially supporting the motor shaft 11a on the clutch housing 32 side; and 42, a ring-like plate member for holding the ball bearing 39 for axially supporting the gear shaft 12 in the stepped bearing hole 41. The plate member 42 is fixed on the steering body 6 by screws 42a. Reference numeral 43 denotes a setscrew of the clutch housing 32 connected to the steering body 6 by spigot joint coupling; 44, a shim which is interposed between a step portion formed by a large-diameter portion of the stepped bearing hole 41 and the ball bearing 39 fitted in the step portion and is used to adjust a teeth contact of the pinion 12a with respect to a teeth portion 10a of the gear wheel 10; and 12b, an adjusting screw hole which is formed in a side surface of the gear shaft 12 on the clutch side and is used to adjust a backlash between the pinion 12a and the gear wheel 10 by pivoting the gear shaft 12 using a proper jig. In the above arrangement, the electromagnetic clutch 30, the motor 11, and the like have well-known structures and perform well-known operations, and therefore a detailed description thereof will be omitted.

According to the present invention, the electric power steering apparatus 1 having the above arrangement comprises the gear mechanism 13 for transmitting a rotational force, which is constituted by a gear pair with non-parallel, non-intersecting axes such as a hypoid gear including the gear wheel 10 on the driven side which has the gear portion 10a on its one side surface and is axially supported on the steering shaft (pinion shaft 3) so as to be coupled in only the rotational direction and movable along the axial direction, and the pinion 12 which laterally meshes with some teeth of the gear portion 10a of the gear wheel 10 to transmit a rotational driving force from the electric motor 11. In addition, the biasing means 60 for elastic supporting is arranged on the other side surface of the gear wheel 10 corresponding to a portion to be meshed with the gear portion 12a of the pinion 12 and locally, axially urges a portion of the gear wheel 10 to be constantly meshed with the pinion 12.

In this embodiment, the biasing means 60 for applying the biasing force to the meshed portion between the gear wheel 10 and the pinion 12 has an arrangement in which a plug holder 62 is threadably engaged in a screw hole 61 formed in a portion of the body 6, and a ball 63 which is held by a receiving member 64 is supported in the plug holder 62 so as to be movable in the axial direction and is constantly biased by a spring 65 to urge, from the back, the portion of the gear wheel 10 to be meshed with the pinion 12, thereby adjusting a backlash in the portion to be meshed with the pinion 12 to be almost zero. Reference numeral 66 denotes an adjusting member threadably engaged with the outer end portion of the holder 62 to hold the spring 65; 66a, an adjusting square hole of the adjusting member 66, and 67, a double nut for fixing the adjusting member 66 to the holder 62. The adjusting member 66 need not be adjusted by the square hole 66a but can be adjusted by forming the head of the adjusting member 66 into a hexagonal nut shape.

With the above arrangement, only some teeth of the gear portion 10a on one side surface of the gear wheel 10 to be meshed with the pinion 12 can be directly urged and biased to constantly obtain a proper meshed state, thereby adjusting the backlash between the gear portions 10a and 12a of the gear wheel 10 and the pinion 12 to be substantially zero in a non-steering state. Therefore, teeth striking noise and the like caused by a play can be prevented when a steering operation is performed clockwise or counterclockwise. In addition, upon the clockwise or counterclockwise steering operation, since the gear wheel 10 is slightly separated from the pinion 12 by the elastic supporting force of the biasing means 60, a backlash to an extent which does not pose any problem of teeth striking noise and allows a predetermined meshing operation can be obtained in the meshed portion between the gear wheel 10 and the pinion 12. Therefore, predetermined transmission of rotation can be performed without causing a falling phenomenon unlike in conventional arrangements. In particular, according to the present invention, the above effects can be obtained since the gear wheel 10 is axially supported on the pinion shaft 3 so as to be coupled in only the rotational direction and axially movable by key coupling or the like and a gap which allows the gear wheel 10 to perform so-called precession is formed between the axially supported portion of the gear wheel 10 and the pinion shaft 3.

The biasing force of the biasing means 60 is set such that only the meshed portion of the gear wheel 10 is directly urged and biased in the axial direction against the pinion 12 to adjust the backlash between the gear portions 10a and 12a to be substantially zero. Alternatively, this elastic supporting force is set such that the gear portions are meshed with each other with only slight teeth striking noise inaudible from outside and the gear wheel 10 is separated to obtain a predetermined meshed state upon a steering operation. The portion of the gear wheel 10 to be axially supported to the pinion shaft 3 need only be coupled in the rotational direction and may allow a slight motion of the gear 10 in the axial and radial directions.

The present invention is not limited to the structure of the above embodiment, but the shape, the structure, and the like of each part can be arbitrarily changed and modified to obtain various modifications of the invention. For example, in the above embodiment, a hypoid gear is used as the gear mechanism 13 for transmitting an auxiliary steering force from the motor 11. The present invention, however, is not limited to the above embodiment, but the gear mechanism 13 may be constituted by a gear pair with non-parallel, non-intersecting axes using spur gears, helical gears, planet gears, bevel gears, or the like.

In the above embodiment, key coupling is used as a means for axially supporting the gear wheel 10 on the pinion shaft 3 as a steering shaft so as to be slidable in the axial direction. However, any conventionally well-known arrangement such as spline coupling can be adopted as long as the gear wheel 10 is coupled in the rotational direction while being movable in the axial direction.

As has been described above, the electric power steering apparatus of the present invention comprises a gear mechanism for transmitting a rotational force, which is constituted by a gear pair with non-parallel, non-intersecting axes such as a hypoid gear including a gear wheel on the driven side which has a gear portion on its one side surface and is coupled and axially supported on a steering shaft in only the rotational direction, and a pinion which laterally meshes with a part of the gear portion of the gear wheel to transmit a rotational driving force from an electric motor. In addition, biasing means for elastic supporting is arranged on the other side surface of the gear wheel corresponding to a portion to be meshed with a gear portion of the pinion and axially urges the portion of the gear wheel to be meshed with the pinion. Regardless of the above simple and inexpensive arrangement, therefore, only some teeth of the gear portion on one side surface of the gear wheel to be meshed with the pinion on the electric motor side can be directly urged and biased to constantly obtain a proper meshed state, thereby adjusting the backlash between the gear portions of the two gears to be substantially zero. Therefore, teeth striking noise and the like caused by a play can be prevented when a steering operation is performed in the clockwise or counterclockwise direction. In addition, upon the clockwise or counterclockwise steering operation, since the gear wheel is slightly separated from the pinion by the elastic supporting force of the biasing means, a backlash to an extent which does not pose any problem of teeth striking noise and allows a predetermined meshing operation can be obtained in the meshed portion between the two gears. Therefore, predetermined transmission of rotation can be properly and reliably performed without deteriorating responsiveness or causing a falling phenomenon unlike in conventional arrangements.

What is claimed is:

1. An electric power steering apparatus which comprises a gear wheel on a driven side having a gear portion on one side surface thereof on a steering shaft and a pinion to be meshed with a gear portion of said gear wheel on a shaft capable of transmitting a rotational driving force from an electric motor, and in which said gear wheel and pinion constitute a gear mechanism for transmitting a rotational force as a gear pair with non-parallel, non-intersecting axes, wherein said gear wheel is axially supported on said steering shaft so as to be coupled in only a rotational direction and movable in an axial direction of said shaft, and biasing means is provided at a position on the other side of said gear wheel opposite to said pinion, said position being at a location opposing a meshed portion of said gear wheel and said pinion, so that said biasing means urges the other side of the gear wheel only toward the meshed portion of said gear wheel and said pinion.

2. An apparatus according to claim 1, wherein said biasing means has a ball to be brought into contact with the other side surface of said gear wheel and a spring for urging said ball.

3. An apparatus according to claim 1, wherein said gear wheel is key-coupled to said steering shaft.

4. An apparatus according to claim 1, wherein said gear wheel constitutes a hypoid gear.

5. An apparatus according to claim 1, wherein an axially supported portion of said gear wheel has a clearance which allows said gear wheel to perform precession.

6. An apparatus according to claim 1, wherein said gear wheel is spline-coupled to said steering shaft.

* * * * *